(12) United States Patent
Caratto et al.

(10) Patent No.: US 9,045,102 B2
(45) Date of Patent: Jun. 2, 2015

(54) SYSTEM FOR PASSIVE ENTRY AND PASSIVE START FOR A MOTOR VEHICLE

(71) Applicant: TRW AUTOMOTIVE ITALIA S.r.l.

(72) Inventors: Danilo Caratto, Turin (IT); Carlo Piazzano, Turin (IT); Samuele Ginevro, Turin (IT)

(73) Assignee: TRW Automotive Italia S.r.l., Turin (IT)

( * ) Notice: Subject to any disclaimer, the term of this patent is extended or adjusted under 35 U.S.C. 154(b) by 0 days.

(21) Appl. No.: 14/141,068

(22) Filed: Dec. 26, 2013

(65) Prior Publication Data

US 2014/0188309 A1    Jul. 3, 2014

(30) Foreign Application Priority Data

Dec. 28, 2012    (IT) ............................... BO2012A0712

(51) Int. Cl.
*B60R 25/00*    (2013.01)
*B60R 25/24*    (2013.01)

(52) U.S. Cl.
CPC ............... *B60R 25/00* (2013.01); *B60R 25/245* (2013.01); *B60R 2325/101* (2013.01)

(58) Field of Classification Search
USPC .......................................................... 701/2
See application file for complete search history.

(56) References Cited

U.S. PATENT DOCUMENTS

| | | | |
|---|---|---|---|
| 5,499,022 A | 3/1996 | Boschini | |
| 6,340,934 B1 * | 1/2002 | Hisada | 340/928 |
| 6,941,197 B1 * | 9/2005 | Murakami et al. | 701/22 |
| 6,963,794 B2 * | 11/2005 | Geber et al. | 701/2 |
| 6,967,567 B1 * | 11/2005 | Hashimoto | 340/425.5 |
| 7,085,637 B2 * | 8/2006 | Breed et al. | 701/38 |
| 7,561,904 B2 * | 7/2009 | Lagnado | 455/575.7 |
| 7,822,546 B2 * | 10/2010 | Lee | 701/412 |
| 8,229,624 B2 * | 7/2012 | Breed | 701/36 |
| 8,456,371 B2 * | 6/2013 | Chen et al. | 343/702 |

(Continued)

FOREIGN PATENT DOCUMENTS

KR    2012 0057180 A    6/2012

OTHER PUBLICATIONS

Heinzelmann; "Energy-Efficient Communication Protocol for Wireless Microsensor Networks"; Published in the Proceedings of the Hawaii International Conference System Sciences Jan. 4, 2000, XP002712422, Hawaii.

(Continued)

*Primary Examiner* — Thomas Tarcza
*Assistant Examiner* — Alex C Dunn
(74) *Attorney, Agent, or Firm* — Dorsey & Whitney LLP

(57) ABSTRACT

A system for passive entry and/or passive start for a motor vehicle is described, which includes an antenna group and an electronic control unit designed to be coupled to the vehicle, the electronic control unit for controlling the antenna group to cooperate with a portable recognition device carried by a user to enable the entry and/or start of the vehicle. The antenna group has at least a first antenna and a second antenna, designed to operate within the frequency range, and according to the communication protocol, of the Bluetooth standard, and having a respective radiation lobe; wherein the first antenna and the second antenna are arranged so that their radiation lobes are arranged on opposite sides with respect to a longitudinal symmetry axis of the motor vehicle.

17 Claims, 5 Drawing Sheets

(56) References Cited

U.S. PATENT DOCUMENTS

| | | | |
|---|---|---|---|
| 8,583,315 B2* | 11/2013 | Whitehead et al. | 701/31.4 |
| 8,751,065 B1* | 6/2014 | Kato | 701/2 |
| 2007/0200672 A1 | 8/2007 | McBride et al. | |
| 2008/0024296 A1* | 1/2008 | Jeong | 340/539.26 |
| 2008/0231416 A1 | 9/2008 | Marlett et al. | |
| 2009/0153295 A1 | 6/2009 | Hamada | |
| 2010/0222939 A1* | 9/2010 | Namburu et al. | 701/2 |
| 2011/0112969 A1* | 5/2011 | Zaid et al. | 705/50 |

OTHER PUBLICATIONS

Italian Search Report from Italian Application No. IT BO20120712 dated Sep. 6, 2013.

Search Report from Application No. GB1323047.9 dated Jun. 27, 2014.

* cited by examiner

SYSTEM FOR PASSIVE ENTRY AND PASSIVE START FOR A MOTOR VEHICLE

The present invention relates to an improved system for passive entry and passive start for a motor vehicle.

BACKGROUND OF THE INVENTION

Passive or hands-free entry and start systems for motor vehicles are known, the systems allowing a user carrying an electronic key (e.g. shaped as a credit card), or another portable electronic device having the same electronic key functions to open and lock the vehicle and/or to start and stop the engine of the vehicle, without needing to carry out active operations, such as pressing a button on a remote control or inserting a mechanical key into a specific latch, or with a considerable reduction of the operations actively requested by the user.

For example, the user may at the most be asked to touch a sensitive part of a vehicle handle or to press a button coupled to the handle to indicate the intention to access the vehicle, or to press a start button inside the vehicle to express the intention to start the engine.

In particular, passive entry/passive start systems of known type for use in a motor vehicle use two different communication channels: a first low frequency radiofrequency communication channel in the LF—Low Frequency range (typically with a frequency of 125 kHz), directed from a central electronic management unit on the vehicle to the electronic key (or similar portable device) carried by the user; and a second radiofrequency communication channel operating at a high frequency (typically in the UHF—Ultra High Frequency radio frequency range, e.g. with values of 315 MHz, 434 MHz or 868 MHz), operating in the reverse direction, i.e. directed from the electronic key carried by the user to the electronic central management unit on the vehicle.

The radiofrequency communication on the first communication channel allows to locate the user carrying the electronic key near the vehicle and to recognize in detail the position respect to the access openings of the same vehicle (typically the right and left front doors and, if required, the tailgate) in order to enable opening of the corresponding locking device of the vehicle.

With this regard, it is worth noting that "locking device" hereinafter means a generic element moveable between an opening position and a locking position, adapted to open or, respectively, lock a corresponding access opening to an internal environment of the vehicle, e.g. including doors, tailgate, an electric window, a sunroof or similar elements.

In particular, known systems envisage the use of a certain number of low frequency antennas, coupled to the vehicle, outside the same vehicle, having appropriate ranges of action to allow to locate the user in required positions with respect to the vehicle. For example, such low frequency antennas are arranged at the right and left doors and at the tailgate of the vehicle.

In general, the low frequency antennas are operatively coupled to a similar antenna integrated in the electronic key so as to detect the presence thereof according to a response received following a query sent to the same electronic key.

The radiofrequency communication on the second communication channel allows to exchange authentication data (e.g. including an appropriate identification code) between the electronic key (or similar portable device) of the user and the electronic central management unit on the vehicle, in order to authenticate the key and authorize the user to enter and/or start the vehicle.

Typically, the second communication channel is activated once the user is effectively located in the neighborhood of the vehicle by means of the communication which occurred on the first communication channel.

Furthermore, passive entry/passive start systems are generally required to discriminate between the situation in which the electronic key is inside the vehicle and the situation in which the same electronic key is outside the vehicle, for example in order to: enable starting the vehicle; lock the doors automatically once the user has actually left the passenger compartment (the so-called walk-away function); avoid the possibility of accidentally leaving the electronic key inside the vehicle after the latter has been locked.

In order to implement such a further location need, known solutions use a low frequency antenna (e.g. again operating at a frequency of 125 kHz), arranged inside the passenger compartment of the vehicle.

In all cases, known systems have some drawbacks which do not allow to exploit their undoubtedly advantageous features to the full (including that of allowing a user to enter and operate a vehicle without performing active actions, besides approaching the vehicle itself and possibly touching or brushing against a respective handle or actuating a start button in the passenger compartment).

In particular, the arrangement and the installation of low frequency antennas for the operations of locating and recognizing the user, in addition to implying non-negligible operating costs and times, require complex wiring, in particular for interfacing with the electronic central management unit on the vehicle. Furthermore, rather complex operations are generally required for calibrating all the antennas.

The described systems are not free from security problems, in particular due to the possibility by persons with malicious intent to intercept the radiofrequency communications and/or use possible radio links (the so-called "two-thief attack") to enter the vehicle to the detriment of the legitimate owner.

SUMMARY OF THE INVENTION

It is the object of the present invention to solve, either entirely or in part, the issues associated to passive entry/passive start systems of a known type illustrated above, and in particular to provide an improved system which is simpler to implement and more reliable than, or at least comparable to, the known solutions.

According to the present invention, an improved passive entry and passive start system for a motor vehicle is provided, as defined in the accompanying claims.

BRIEF DESCRIPTION OF THE DRAWINGS

For a better understanding of the present invention, a preferred embodiment will now be described by way of non-limiting example only, and with reference to the appended drawings, in which.

DETAILED DESCRIPTION OF THE INVENTION

Figure 1:
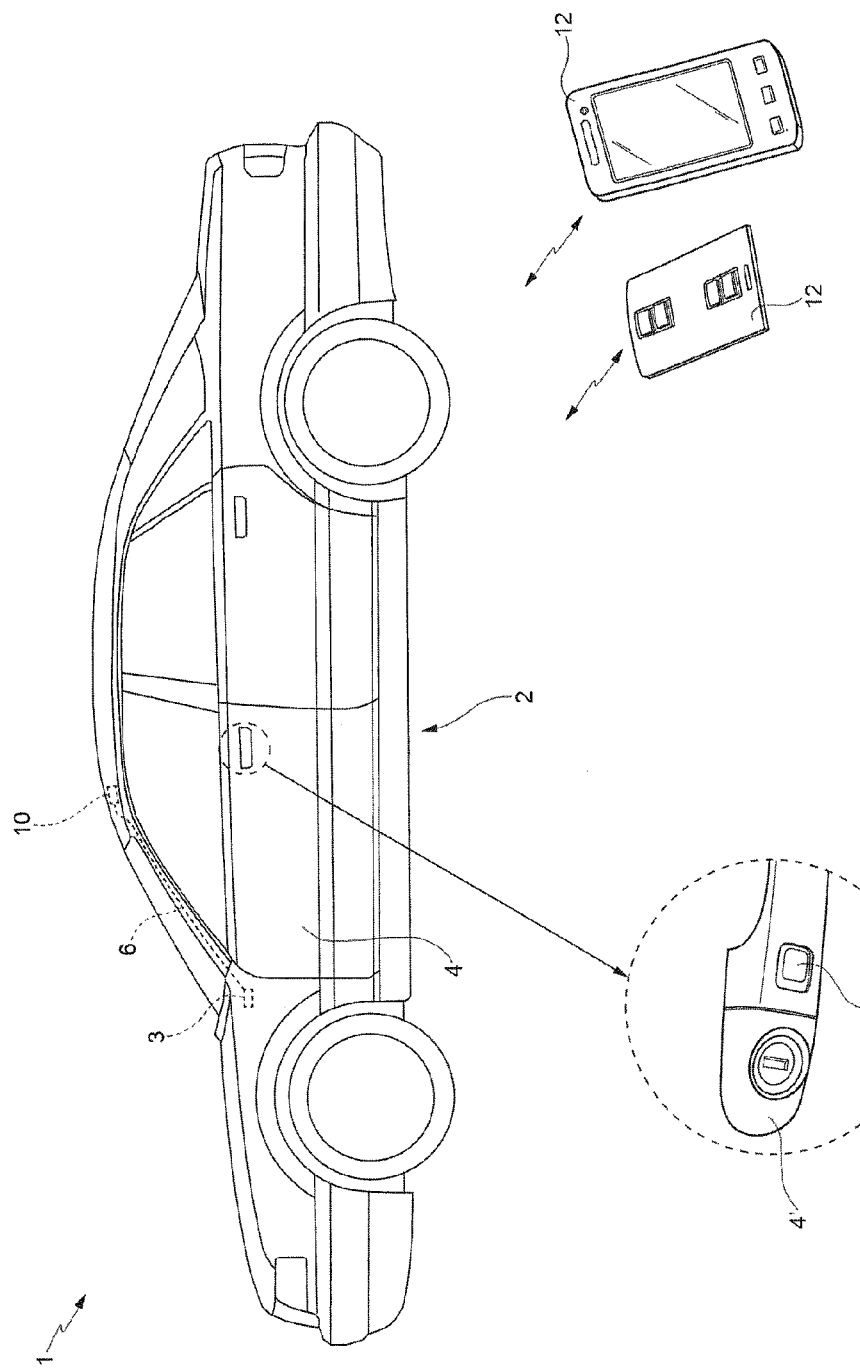
FIG. 1 diagrammatically shows a motor vehicle and a respective passive entry and passive start system, according to an aspect of the present invention.
Figure 2:
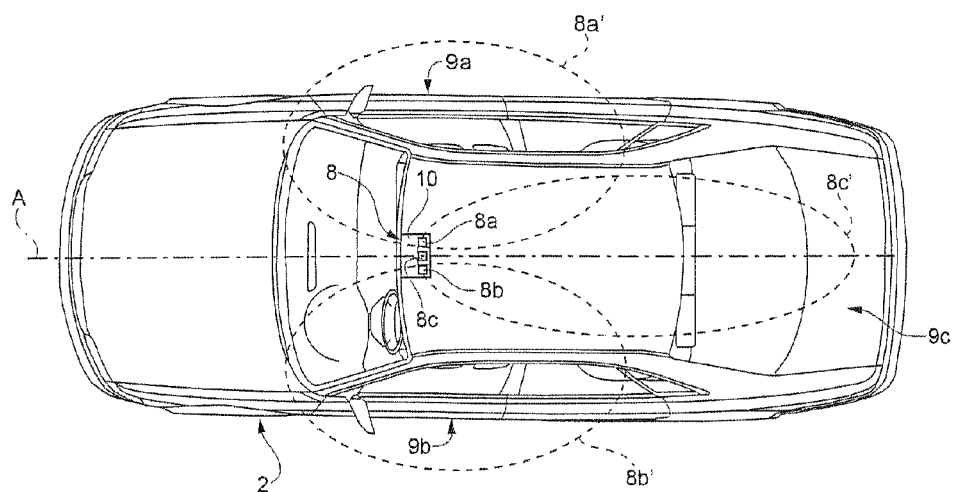
FIG. 2 diagrammatically shows the respective range of action of Bluetooth antennas of the system in FIG. 1.
Figure 3:
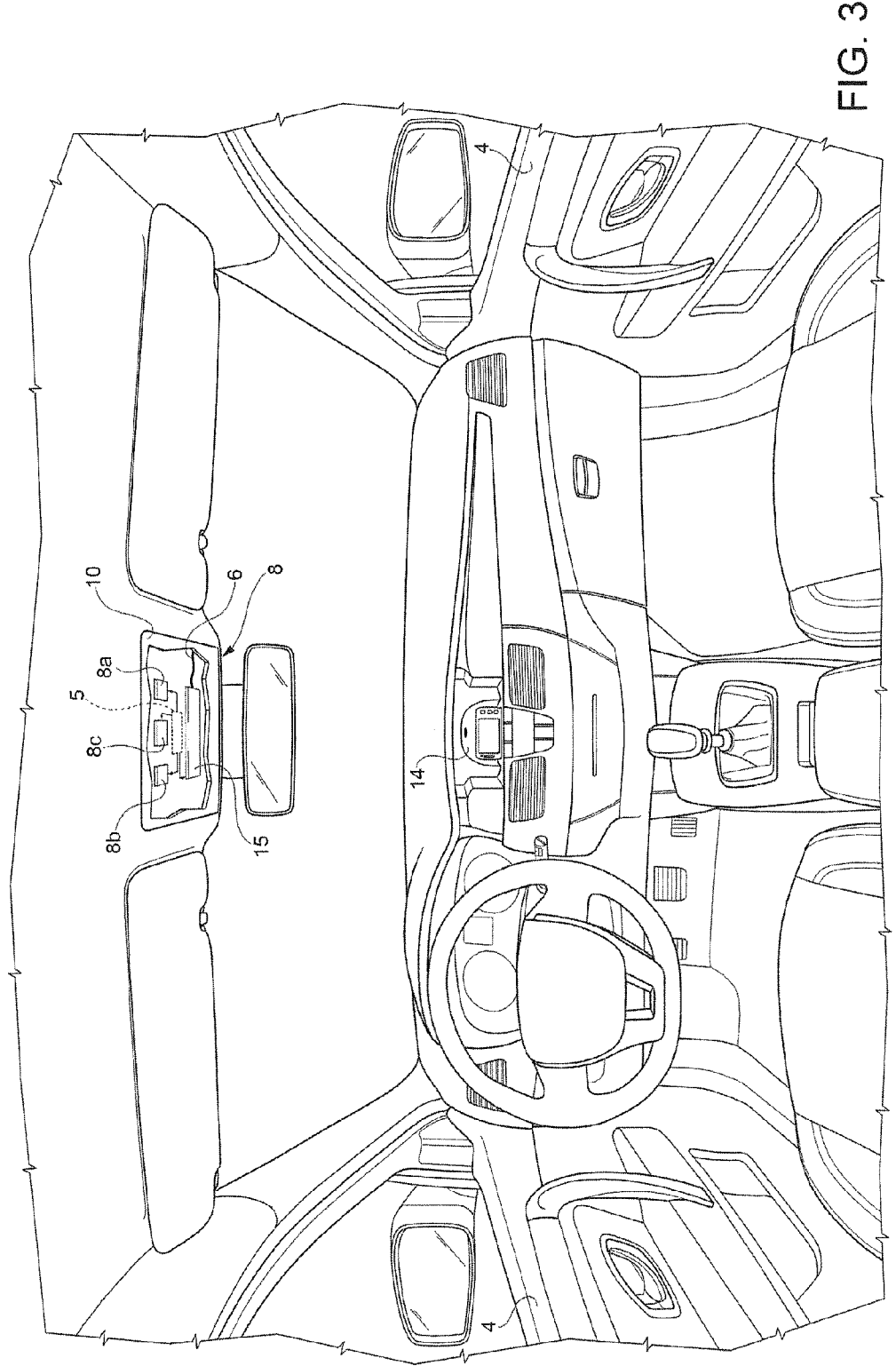
FIG. 3 shows a detail of the inside compartment of the motor vehicle of FIG. 1.

As shown in FIGS. 1-3, the passive start and passive entry system according to the present invention, indicated in general by reference numeral 1, may be advantageously, but not exclusively, applied to allow access to a motor vehicle, indicated by reference numeral 2, e.g. a car, and to start the engine (not shown) of the same vehicle 2.

In a known manner, the vehicle 2 is provided with a central management unit 3 (the so-called "body computer" or "ECU") including appropriate programs and software configurations for managing the various functions of the vehicle.

In particular, the central management unit 3 is operatively coupled to a releasing mechanism (not shown) of doors 4 of the vehicle 2 (or similar locking devices), so as to be able to enable opening thereof and allow entering the vehicle 2; furthermore, the central management unit 3 is operatively coupled to the engine of the vehicle 2 so as to enable starting thereof.

The system 1 comprises an electronic control unit 5 coupled to the vehicle 2 and including a processing unit, for example a microprocessor or a microcontroller; the electronic control unit 5 is connected to the central management unit 3 of the vehicle 2 by means of a communication line 6, e.g. of the CAN (Controller Area Network) type.

The electronic control unit 5 is provided with a memory, e.g. a non-volatile memory, in which appropriate software programs and instructions are stored to execute the operations which will be described in detail below.

The system 1 further comprises an antenna group 8, operating for radiofrequency transmitting and receiving, which is operatively coupled to the electronic control unit 5.

According to an aspect of the present invention, the antenna group 8 can be controlled to operate in the frequency range, and according to the communication protocol, of the Bluetooth standard (BT, hereinafter), in particular low-energy Bluetooth (BLE, hereinafter).

In known manner, the BLE protocol is included in the 4.0 version of the Bluetooth communication technology, and allows a short-range communication (less than one hundred meters) with low latency and low energy consumption, in the radiofrequency range included between 2.4 GHz and 2.5 GHz.

In particular, the antenna group 8 comprises a first antenna BT 8a, of directive type, arranged so that the radiation lobe (or coverage area) 8a' thereof is directed towards a first side of the vehicle 2 (with respect to a longitudinal symmetry axis A thereof), e.g. the right side, in particular including at least the zone in front of the front right door, indicated by reference numeral 9a.

The antenna group 8 further comprises a second antenna BT 8b, of directive type, arranged so that the radiation lobe (or coverage area) 8b' thereof is directed towards a second side of the vehicle 2 (with respect to the longitudinal symmetry axis A thereof), the left side in the example, in particular including at least the zone in front of the front left door, indicated by reference numeral 9b.

The radiation lobes 8a' and 8b' are symmetric with respect to the longitudinal symmetry axis A.

In a possible embodiment, the antenna group 8 further includes a third BT antenna 8c, of directive type, arranged so that the radiation lobe 8c' thereof is directed towards the rear part of the vehicle 2 (along the same longitudinal symmetry axis A), in particular including at least the zone of the truck (or rear luggage compartment) 9c of the vehicle 2 and the zone in front of it.

However, it is worth noting that the presence of the third antenna BT 8c, although advantageous, is not strictly required for the purposes of the present solution.

According to a particular aspect of the present solution, the antenna group 8 is integrated within a single casing 10, arranged on board the vehicle 2, e.g. at the ceiling light of the vehicle, i.e. coupled to the inner surface of the roof, in a central front position with respect to the passenger compartment.

In particular, according to a further aspect of the present solution, the same electronic control unit 5 is integrated in the single casing 10.

Such a solution is particularly advantageous because it considerably simplifies the wiring, the times and the costs of installing the single casing 10 in the vehicle 2. Additionally, the electric connection to such a casing 10 may exploit the electric connection lines already provided in the vehicle 2 at the ceiling light, e.g. the CAN (Controller Area Network) communication line.

The system 1 further comprises a portable recognition device 12, intended to be carried by the user of the vehicle 2, which has to be enabled to enter and start the same vehicle 2.

Typically, such a portable recognition device 12 may be an electronic key, but it may also be any appropriately configured portable electronic apparatus, such as, for example, a cellular telephone, a smartphone, a palmtop, a tablet, a PDA (Personal Data Assistant), a laptop computer.

The electronic control unit 5 and the portable recognition device 12, according to the methods which will be described in detail hereinafter, are designed to exchange signals, information and/or data in order to allow the identification of the portable recognition device 12 by the vehicle 2 and the subsequent authorization to operate the vehicle 2 by the user holding the portable recognition device 12.

Figure 4:
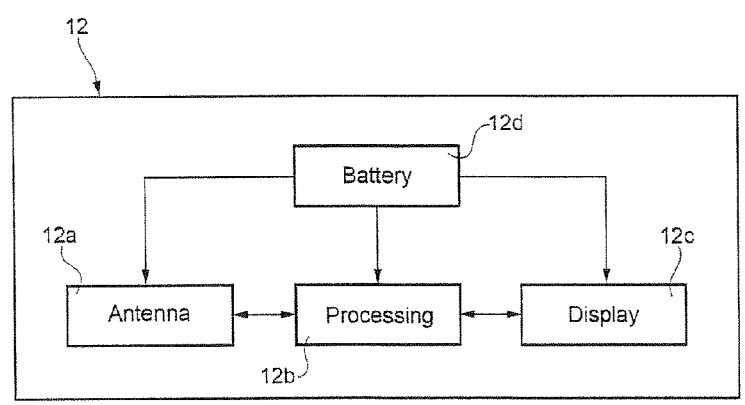
FIG. 4 is a block chart of a portable recognition device of the system in FIG. 1.

As shown in FIG. 4, the portable recognition device 12 comprises: a transceiver module 12a, including a respective antenna operating in the Bluetooth technology radiofrequency range, so as to operatively couple, during use, with the antenna group 8 of the vehicle 2; a processing module 12b, including a respective processing unit, e.g. a microprocessor or a microcontroller, operatively connected to the transceiver module 12a, e.g. to communicate data according to the Bluetooth protocol; and, optionally, a display module (or display) 12c, connected to the processing module 12b, which can be operated for displaying data to the user.

The portable recognition device 12 further comprises a battery 12d, e.g. a common lithium battery, for powering the transceiver module 12a, the processing module 12b and the display module 12c.

The system 1 further comprises: an actuating element 13 (FIG. 1), coupled externally to the vehicle 2, e.g. in form of a button located at the handles (indicated by reference numeral 4') of the doors 4; and, inside the vehicle 2, a housing element 14 (FIG. 3, e.g. in form of a cradle), arranged, for example, at the dashboard, adapted to house the portable recognition device 12 when it is inside the vehicle 2.

Optionally, advantageously but not necessarily, the system 1 may comprise a further antenna 15, operating in the low or medium frequency range (LF—Low Frequency), considered using the common conventions in the field, e.g. with a frequency comprised between 100 kHz and 150 kHz, in one embodiment equal to 125 kHz; such an antenna, denoted as antenna LF 15 hereinafter, is arranged on board the vehicle 2 and operatively coupled to the electronic control unit 5.

Advantageously, also the antenna LF 15 may be integrated inside the single casing 10 arranged in the passenger compartment of the vehicle 2, so as to further simplify installation and wiring.

Figure 5:
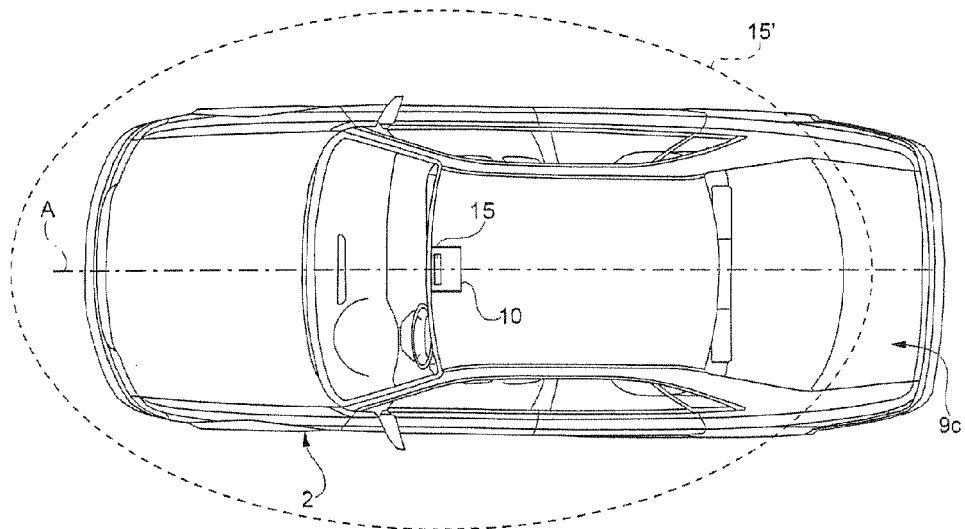
FIG. 5 diagrammatically shows the range of action of a low frequency antenna of the system in FIG. 1.

As shown in FIG. 5, the radiation pattern 15' of the antenna LF 15 is such as to include essentially the entire passenger compartment of the vehicle 2, in addition to the external area in the immediate proximity of the vehicle 2, at the front part (along the longitudinal symmetry axis A), and laterally to the front and rear doors 4 of the same vehicle. The radiation pattern of the LF antenna 15 further includes at least part of the zone of trunk 9c of the vehicle 2.

Figure 6:
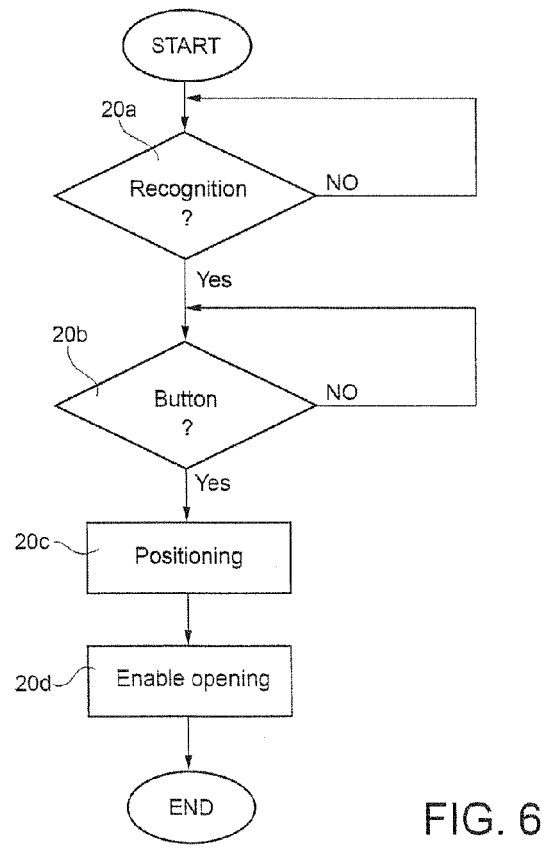
FIG. 6-8 are flow charts related to operations carried out in the system in FIG. 1.

The operation of the system 1, related to the passive entry and passive start operations of the vehicle 2, will now be illustrated with reference to the flow charts shown in FIGS. 6, 7 and 8.

In particular, the passive entry operation, i.e. the operation for enabling the user to open the doors 4 of the vehicle 2, is firstly described with reference to FIG. 6.

During an initial step 20a, the electronic control unit 5 waits for the user to be identified generically in the neighborhood of the vehicle 2, by either identifying or recognizing the respective portable recognition device 12.

For this purpose, in a possible embodiment, the electronic control unit 5 controls the antenna group 8 in a reception state, so as to be able to receive a query message transmitted by the transceiver module 12a of the portable recognition device 12 actuated in polling mode by the processing module 12b, e.g. once every 5 seconds.

Alternatively, any Bluetooth pairing technique may be used for the identification of the portable recognition device 12 by the electronic control unit 5.

Afterwards, the electronic control unit 5 (step 20b) waits to recognize the user's intention to enter the vehicle 2, e.g. by pressing a mechanical button or a similar actuating element 13, arranged at the handles 4' of the doors 4, or approach to a predetermined zone of the same doors 4 (such an approach may be identified using a capacitance technique e.g. by means of a contactless capacitance sensor or an optical sensor, e.g. an IR sensor).

If the user's intention is positively recognized (step 20c), the electronic processing unit 5 carries out appropriate processing, aimed at locating the portable recognition device 12 with respect to the vehicle 2.

For this purpose, the electronic control unit 5 acquires at least the signals received by the first antenna BT 8a and by the second antenna BT 8b, and determines the intensity thereof, e.g. by evaluating the so-called RSSI (Received Signal Strength Indicator), or any similar signal strength indicator; advantageously, the RSSI information is included in the so-called "proximity profile" of the Bluetooth protocol.

In general, such a processing may in any case include any evaluation, of a known type (consequently not described here in detail) according to the strength of the transmitted signal and the intensity of the received signal.

Given the directionality of the antennas BT 8a, 8b, the portable recognition device 12 is located to be near the side of the vehicle 2, with respect to the longitudinal axis A, corresponding to the first or second antenna 8a, 8b, which receives the signal with greater intensity (RSSI).

Advantageously, the processing carried out in real time by electronic control unit 5 may be simplified during such a step 20c by carrying out an initial empirical calibration operation and storing the RSSI values (or values of a similar intensity indicator) associated to a plurality of predetermined positions of the portable recognition device 12 in the neighborhood of the vehicle 2 within the memory associated to the electronic control unit 5 (e.g. in the form of a so-called look-up table). In such a manner, an RSSI measurement received in real time may be associated to a corresponding position with respect to the vehicle 2 by consulting the closest data present in the table.

After such a processing (step 20d), the electronic control unit 5 thus enables the opening of the door 4 of the vehicle 2, which corresponds to the performed location (by means of appropriately communication with the central management unit 3 of the vehicle 2).

In particular, only the door 4 (or similar locking device) of the vehicle 2 which is closest to the position in which the portable recognition device 12 (and thus the user) was located is actually enabled for opening.

With this regard, it is apparent that similar operations may be carried out to enable the opening of the trunk 9c of the vehicle 2 according to the signals received by the possible third antenna BT 8c and comparing them with the signals received from the first and the second antenna BT 8a, 8b.

In a possible embodiment, enabling of the opening of the door 4 at the side of the vehicle 2 where the portable recognition device 12 was located may be subordinated to pressing of the actuation element 13 on the same side of the vehicle 2 by the user.

In a possible alternative solution, the electronic control unit 5 may control the antenna group 8 in a reception state of the query message transmitted by the transceiver module 12a of the portable recognition device 12 only after having detected the user's intention to enter the vehicle 2 (e.g. by pressing the actuation element 13).

It is worth emphasizing that, as further variant embodiment, a step of verifying the user's intention to enter the vehicle 2 may instead not be envisaged.

Furthermore, Bluetooth communication between the portable recognition device 12 and the electronic control unit 5, aimed at enabling the opening of the doors 4 of the vehicle 2, may be directly started by the user by pressing a button or similar element on the portable recognition device 12 itself, operating in this case as a traditional remote control (the so-called RKE—Remote Keyless Entry function).

Figure 7:
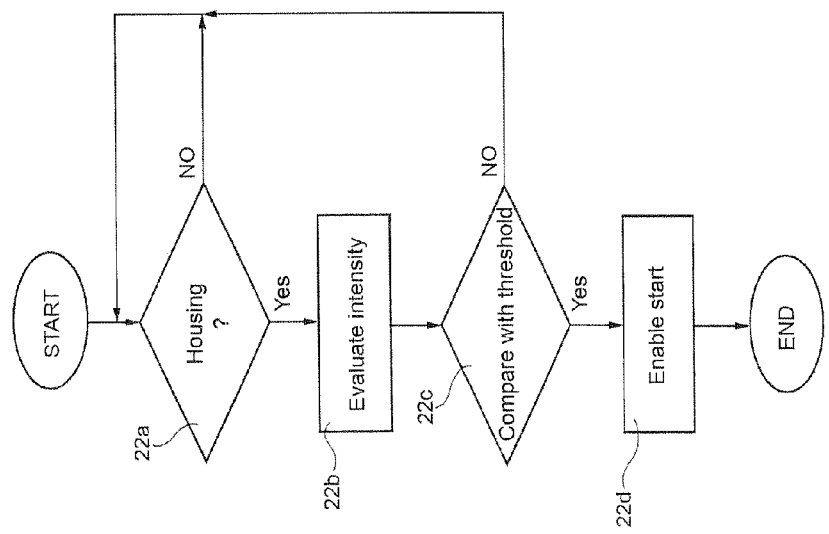

With reference to FIG. 7, the starting operation of the vehicle 2 (so-called passive start) will now be described, i.e. the passive enabling of the user who entered the passenger compartment to start the engine of the vehicle 2.

According to an aspect of the present solution, such an operation requires the user to arrange the portable recognition device 12 inside the housing element 14, arranged in the passenger compartment. In particular, when it is placed inside the housing element 14, the portable recognition device 12 may establish an automatic recognition (pairing) operation with regards to the electronic control unit 5, so as to allow two-way data communication.

In an initial step 22a, the electronic control unit 5 thus determines the presence of the portable recognition device 12 within the housing element 14 in the passenger compartment of the vehicle 2, e.g. by reading the signal supplied by a presence switch (not shown) coupled (with any known technique) to the same housing element 14.

In case of positive determination (step 22b), the electronic control unit 5 activates the antenna group 8 (in particular, the first and/or the second antenna BT 8a, 8b) in reception mode, so as to acquire the signals sent by the transceiver module 12a of the portable recognition device 12, and calculates the intensity, e.g. again by verifying the RSSI value.

In a possible embodiment, an average of the intensities of the signals received by the first and the second antenna BT 8a, 8b, and/or of the signals received in consecutive intervals of time, may be performed.

If (step 22c) the calculated intensity is higher than a preset threshold, the electronic control unit 5 enables starting of the vehicle 2 (by communicating with the electronic management unit 3 of the vehicle 2), since the presence of the portable recognition device 12 in the passenger compartment of the vehicle 2 has been confirmed. Such a starting may then occur after pressing an appropriate start button by the user.

Additionally, or alternatively, the electronic control unit 5 may control that the intensity of the signals received in the consecutive intervals of time remains nearly constant and stationary (i.e. is not variable over time), in order to verify that the portable recognition device 12 is actually in the passenger compartment of the vehicle 2, essentially retained in the respective housing element 14.

Alternatively, even if the housing 14 is not provided, or if the portable recognition device 12 is not inserted in the same housing 14, the electronic control unit 5 may recognize the portable recognition device 12 to be inside the passenger compartment by processing the intensity of the received signals. Indeed, in any case, the portable recognition device 12 is essentially stationary when the user is inside the passenger compartment (even if the portable recognition device 12 is, for example, worn by the user, e.g. in a pocket, or placed inside a compartment in the passenger cabin). Thus, comparing the intensity of the received signals with one or more thresholds in addition to verifying the stationarity of the signals may be sufficient to determine the presence of the portable recognition device 12 inside the vehicle 2.

If the result of the verification in step 22c is not positive, the electronic control unit 5 will not carry out any enabling operation.

Figure 8:
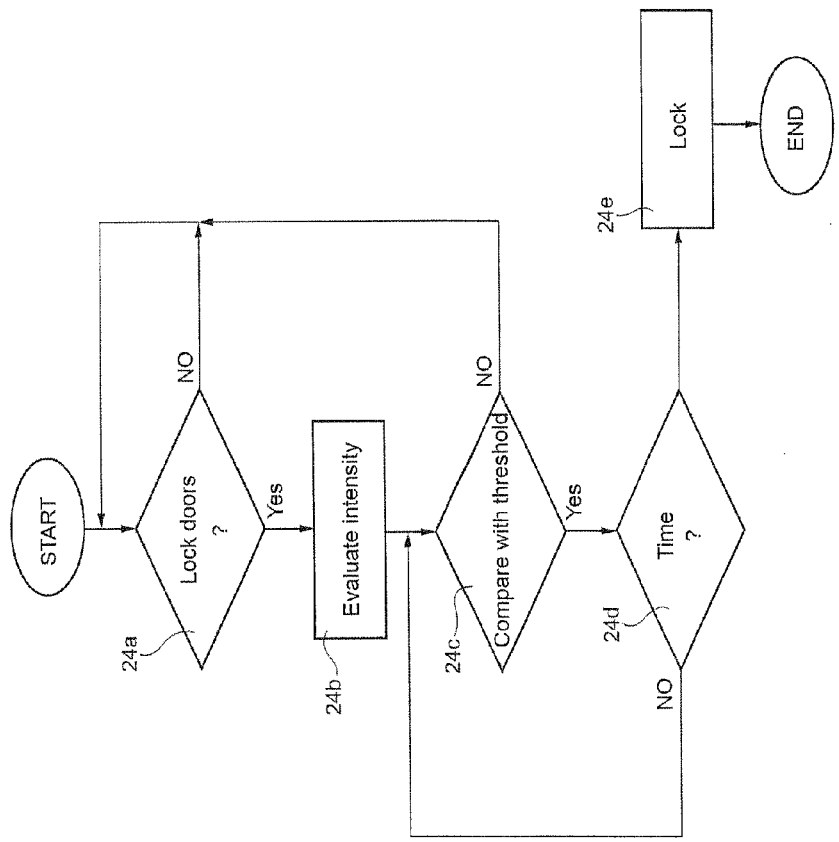

With reference to FIG. 8, the automatic locking operation of the vehicle 2 following the moving away of the user (the so-called walk-away function) will now be described. According to an aspect of the present solution, such a function is managed according to the Bluetooth technology communication between the electronic control unit 5 coupled to the vehicle 2 and the portable recognition device 12.

In particular, during an initial step 24a, the electronic control unit 5 determines that the doors 4 of the vehicle 2 have been mechanically closed (in particular, the door 4 on driver's side), e.g. by reading the signal supplied by a closing switch coupled to the doors 4 themselves.

In the positive case (step 24b), the electronic control unit 5 activates the antenna group 8 (in particular, the first and/or the second antenna BT 8a, 8b) in reception mode so as to acquire the signals sent by the transceiver module 12a of the portable recognition device 12, and calculates the intensity, e.g. by again verifying the RSSI value.

Also in this case, an average of the intensities of the signals received by the first and the second antenna BT 8a, 8b, and/or of the signals received in consecutive intervals of time may be determined.

If (step 24c), the calculated intensity is lower than a given preset threshold, the electronic control unit 5 determines the positive moving away of the portable recognition device 12 (and consequently of the user) from the vehicle 2.

The method then goes on to a step 24d, in which the electronic control unit 5 waits for a preset interval of time, e.g. equal to 3 s, to expire before locking the doors (step 24e), by communicating with the central management unit 3 of the vehicle 2.

In a known manner (not described here in detail), the various operations described above may include in all cases the need for the electronic control unit 5 to receive and recognize a code, or similar identification information, included in the signals received by the portable recognition device 12 (e.g. according to a known communication mechanism of the challenge-response type, not described here in detail).

According to a further aspect of the present solution, in general, all the operations described above may be assisted by the information transmitted and received by the further antenna LF 15 coupled to the vehicle 2, e.g. if the evaluations associated to the Bluetooth signals alone are not deemed reliable by the electronic control unit 5 (e.g. due to interferences present in the environment of use).

In a traditional manner (not discussed here in detail), the information associated to the antenna LF, may indeed allow to help locating the portable recognition device 12 when it is in close proximity to the same antenna LF 15 (e.g. in a neighborhood of 3 m-4 m).

For example, the information transmitted and received by the antenna LF 15 may assist the walk-away operation, in particular to discriminate whether the portable recognition device 12 is either inside or outside the vehicle 2 by evaluating the intensity of the signal and comparing it with a single threshold.

Similarly, such information may assist the passive start operation, again by allowing to discriminate whether the portable recognition device 12 is either inside or outside the vehicle 2 (also in this case, by evaluating the intensity of the signal and comparing it with a threshold).

Such an auxiliary function may be particularly useful if no housing 14 is provided for accommodating the portable recognition device 12 inside the passenger compartment (e.g. in order to allow an easier locating of the portable recognition device 12, if it is in the truck 9c of the vehicle 2).

The advantages of the system according to the present invention are apparent from the description above.

In particular, it is worth emphasizing again that the described solution allows to considerably simplify passive access and passive start system associated to the vehicle 2 by using directive antennas operating with a single Bluetooth communication protocol (antennas BT 8a-8c) for all the required operations (contrary to known solutions which include at least two different radiofrequency communication channels).

The installation and wiring of the system are considerably simplified, by virtue of the reduction of the component elements and of the concentration of the same elements in a single housing 10 within the vehicle 2 (such a single housing 10 being itself easily reachable by the wiring, including pre-existing wirings).

The use of the Low Energy Bluetooth communication protocol allows, in particular, to reduce the energy consumption associated to the start operations of the vehicle 2; with this regard, tests carried out by the Applicant have indicated a duration of approximately up to two years of the battery 12d in the portable recognition device 12.

The reliability of the operations is high, also by virtue of the assistance of the further antenna LF 15.

The security of the system is increased by virtue of the intrinsic security of the Bluetooth communication technology (e.g. by exploiting the frequency hopping mechanism and/or the 128-bit encryption system included in the protocol).

The use of the Bluetooth communication allows to increase considerably the range of the system (e.g. up to a distance of approximately 50 meters from the vehicle 2); furthermore, the maximum range of communication may be advantageously and appropriately adjusted by varying the transmission power of the Bluetooth signal.

Moreover, use of the same Bluetooth communication allows the two-way, remote transfer of further information and data once the communication protocol is established between the portable recognition device 12 and the electronic control unit 5 (and the central management unit 3 of the vehicle 2). For example, data related to the state of the vehicle 2 (opening state of the doors, light on/off state etc.), diagnostic information or other may be sent, and such data and information may be displayed by the display module 12c of the portable recognition device 12.

It is finally apparent that changes and variations may be made to what described and illustrated herein without departing from the scope of the present invention, as defined in the accompanying claims.

For example, the further antenna LF 15, instead of operating at the frequency of 125 kHz, could operate according to a different low or medium frequency wireless proximity communication standard, e.g. according to the NFC (Near Field Communication) standard. Such a solution may be advantageous if the portable recognition device 12 (e.g. a smartphone) is already provided with such a technology, thus minimizing the hardware/software changes required for implementing the operations required by the system 1.

In some applications, it may be advantageous to use further low frequency antennas, to be arranged appropriately with respect to the vehicle 2, e.g. to identify the presence of the portable recognition device 12 (and of the user) near particular zones of the vehicle 2, e.g. a sliding tailgate of a van or similar goods transport vehicle.

The arrangement of the antennas BT 8a-8c and of the antenna LF 15 with respect to the vehicle 2 could be different from that described and illustrated above.

Furthermore, an alternative mechanism for use of the vehicle 2 may be provided within the portable recognition device 12, in case the recognition and authorization operations described above cannot be carried out (e.g. because the battery 12d provided for supplying power is either flat or not sufficiently charged), such a mechanism is usually known as recovery mechanism.

In particular, a normal mechanical key may be provided in the portable recognition device 12 to allow to open the doors 4 of the vehicle 2; similarly, a two-way passive connection of the electromagnetic type in the low frequency range may be provided in the passenger compartment for data exchange to allow start of the vehicle.

The invention claimed is:

1. A system for passive entry and/or passive start for a motor vehicle, the system comprising:
   an antenna group;
   an electronic control unit designed to be coupled to the motor vehicle, the electronic control unit being configured to control the antenna group to cooperate with a portable recognition device carried by a user to enable the entry and/or start of the motor vehicle;
   wherein the antenna group includes at least a first antenna and a second antenna, designed to operate within a frequency range, and according to a communications protocol of the Bluetooth standard, and each having a respective radiation lobe; and
   a casing designed to be rigidly coupled to the motor vehicle and configured to house, in an integrated manner, the first and second antennas and the electronic control unit;
   wherein the casing is designed to be arranged inside an interior compartment of the motor vehicle, in a front middle position, so that the respective radiation lobes of the first and second antennas are directed towards a first and a second door of the motor vehicle, arranged on opposite sides with respect to a longitudinal symmetry axis of the motor vehicle.

2. The system according to claim 1, wherein the first and second antennas are adapted to operate according to the Low Energy protocol of the Bluetooth standard.

3. A system for passive entry and/or passive start for a motor vehicle, the system comprising:
   an antenna group; and
   an electronic control unit designed to be coupled to the motor vehicle, the electronic control unit being configured to control the antenna group to cooperate with a portable recognition device carried by a user to enable the entry and/or start of the motor vehicle;
   wherein the antenna group includes at least a first antenna and a second antenna, designed to operate within a frequency range, and according to a communications protocol of the Bluetooth standard, and each having a respective radiation lobe;
   wherein the first antenna and the second antenna are arranged so that the respective radiation lobes thereof are arranged on opposite sides with respect to a longitudinal symmetry axis of the motor vehicle;
   wherein the electronic control unit is configured to cooperate with the first and second antennas to perform a locating operation for locating the portable recognition device with respect to the motor vehicle.

4. The system according to claim 3, further comprising a casing, designed to be rigidly coupled to the motor vehicle, and configured to house, in an integrated manner, the first and second antennas and the electronic control unit.

5. The system according to claim 3, wherein the electronic control unit is configured to receive signals from the first and second antennas, and to perform the locating operation according to a comparison of intensity of the signals received from the first and second antennas, the location referring to a position of the portable recognition device outside the motor vehicle with respect to a longitudinal symmetry axis of the motor vehicle.

6. The system according to claim 5, wherein the electronic control unit is configured to cause the actuation of a device for closing the motor vehicle, corresponding to the located position of the portable recognition device.

7. The system according to claim 3, wherein the electronic control unit is configured to receive signals from the first and second antennas, and to perform the locating operation according to the comparison of intensity of the signals received from the first and/or second antenna with at least one preset threshold, the location referring to a position of the portable recognition device inside the motor vehicle.

8. The system according to claim 7, further comprising a housing element for accommodating the portable recognition device, designed to be arranged inside the motor vehicle.

9. The system according to claim 7, wherein the electronic control unit is configured to perform the locating operation according to a temporal variability of the intensity of the signals received from the first and/or second antenna.

10. The system according to claim 7, wherein the electronic control unit is configured to cause the start of the motor vehicle, according to the positive location of the portable recognition device inside the motor vehicle.

11. The system according to claim 1, wherein the antenna group includes a third antenna, designed to operate within the frequency range, and according to the communications protocol, of the Bluetooth standard, and having a respective radiation lobe intended to include a rear portion of the motor vehicle with respect to the longitudinal symmetry axis.

12. A system for passive entry and/or passive start for a motor vehicle, the system comprising:
an antenna group; and
an electronic control unit designed to be coupled to the motor vehicle, the electronic control unit being configured to control the antenna group to cooperate with a portable recognition device carried by a user to enable the entry and/or start of the motor vehicle,
wherein the antenna group includes at least a first antenna and a second antenna, designed to operate within a frequency range, and according to a communications protocol of the Bluetooth standard, and each having a respective radiation lobe;
wherein the first antenna and the second antenna are arranged so that the respective radiation lobes thereof are arranged on opposite sides with respect to a longitudinal symmetry axis of the motor vehicle;
wherein the antenna group includes an auxiliary antenna, operating within the low frequency range LF;
wherein the electronic control unit is configured to cooperate with the first and second antennas to perform a locating operation for locating the portable recognition device with respect to the motor vehicle, and with the auxiliary antenna as an aid for the locating operation.

13. The system according to claim 12, wherein the auxiliary antenna is designed to operate at a frequency between 100 kHz and 150 kHz.

14. The system according to claim 12, wherein the auxiliary antenna is designed to operate according to the short-range wireless communication technology NFC—Near Field Communication.

15. The system according to claim 12, further comprising a casing, designed to be fixedly coupled to the motor vehicle, and configured to house, in an integrated manner, the first and second antennas and the electronic control unit; the casing further being designed to house, in an integrated manner, the auxiliary antenna.

16. The system according to claim 1, wherein the portable recognition device is selected within the group comprising: an electronic key; a cellular phone, a smartphone, a palmtop, a tablet, a PDA—Personal Data Assistant, a laptop.

17. A motor vehicle including the system for passive entry and/or passive start according to claim 1.

* * * * *